March 1, 1966 E. R. GILL, JR 3,237,331
SIGN CONSTRUCTION
Filed April 5, 1963 5 Sheets-Sheet 1
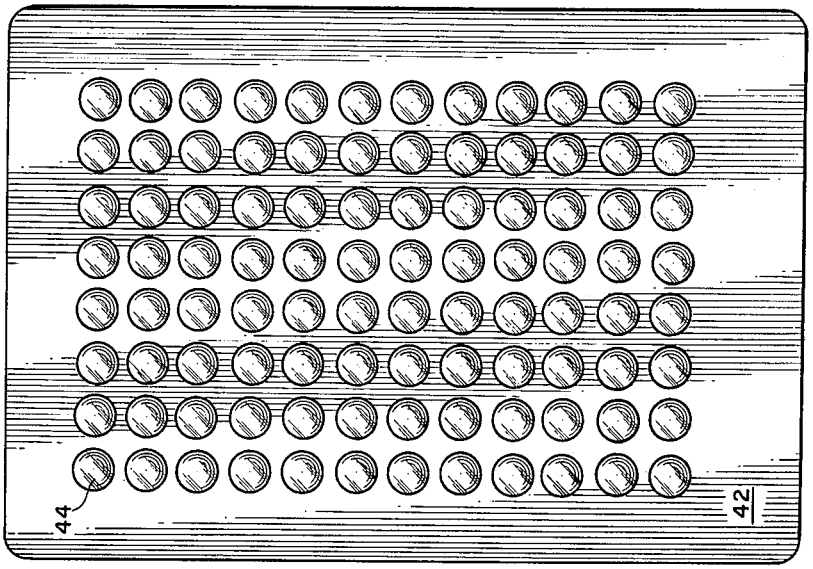
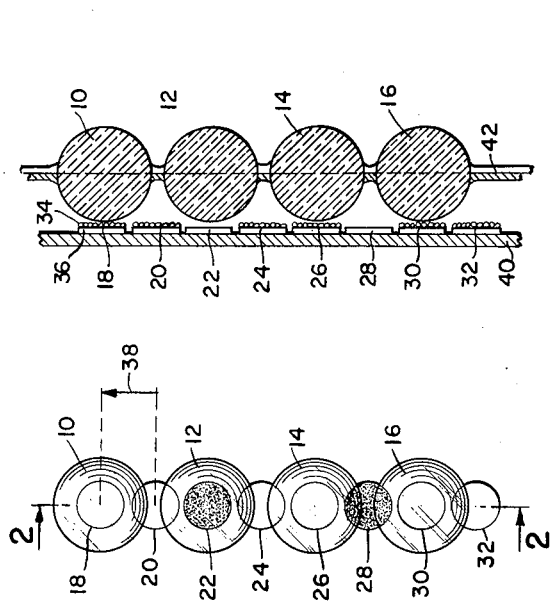
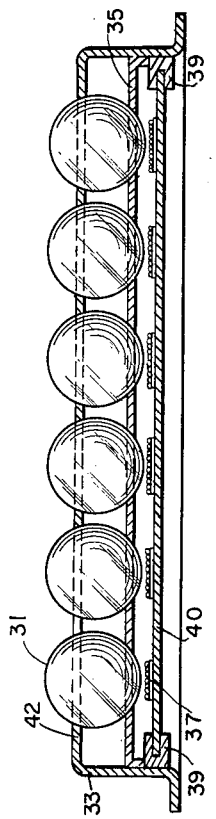
INVENTOR
Edwin R. Gill, Jr.
BY *Karl W. Flocks*
ATTORNEY March 1, 1966  E. R. GILL, JR  3,237,331
SIGN CONSTRUCTION Filed April 3, 1963  5 Sheets-Sheet 2

INVENTOR
Edwin R. Gill, Jr.

BY *Karl W. Flocks*
ATTORNEY

March 1, 1966 E. R. GILL, JR 3,237,331
SIGN CONSTRUCTION
Filed April 3, 1963 5 Sheets-Sheet 3
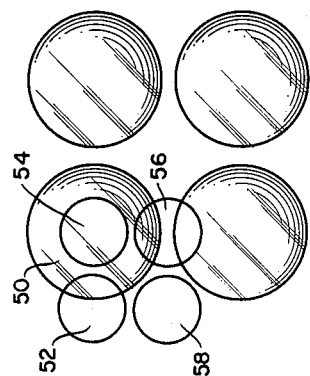
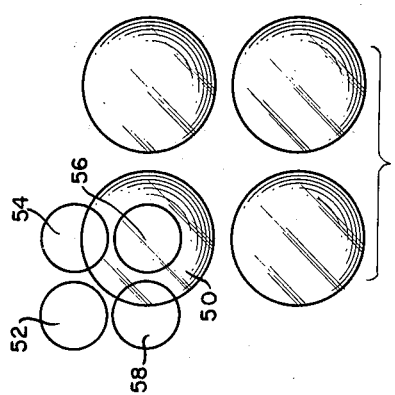
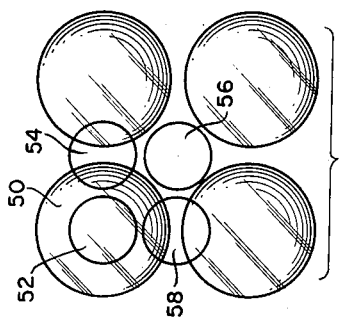
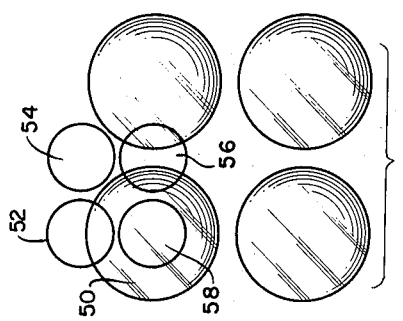
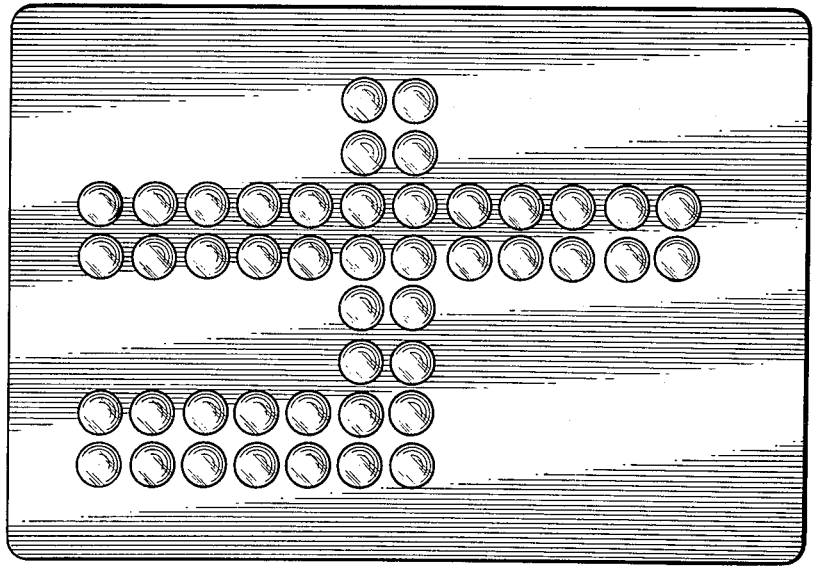
INVENTOR
Edwin R. Gill, Jr.
BY *Karl W. Flocks*
ATTORNEY March 1, 1966  E. R. GILL, JR  3,237,331
SIGN CONSTRUCTION
Filed April 3, 1963  5 Sheets-Sheet 4
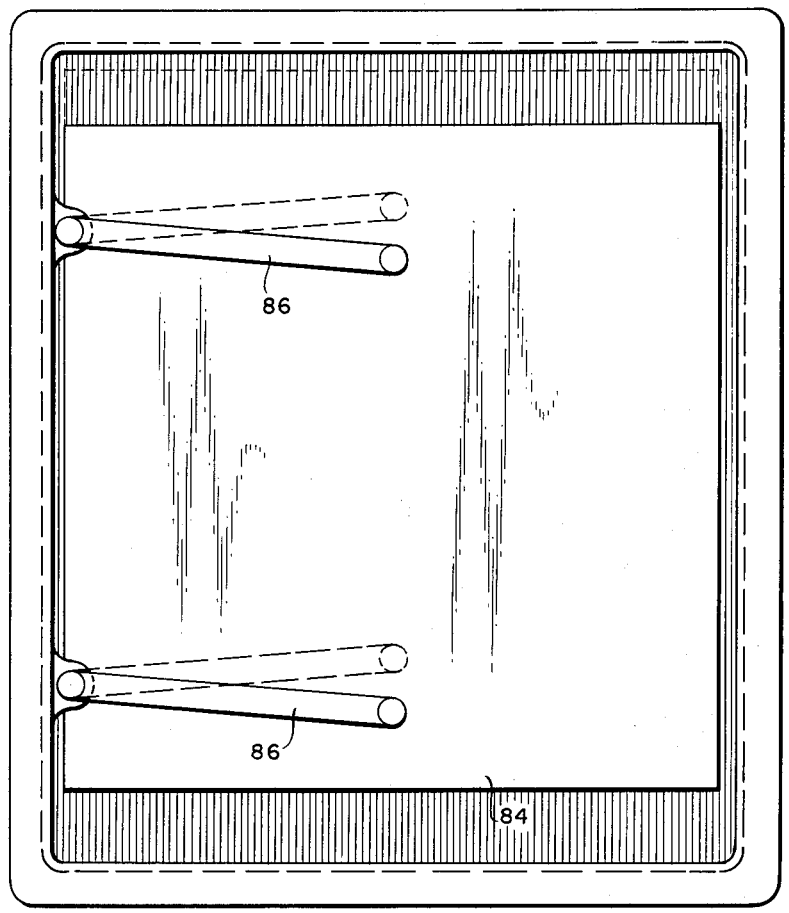
FIG. 14.
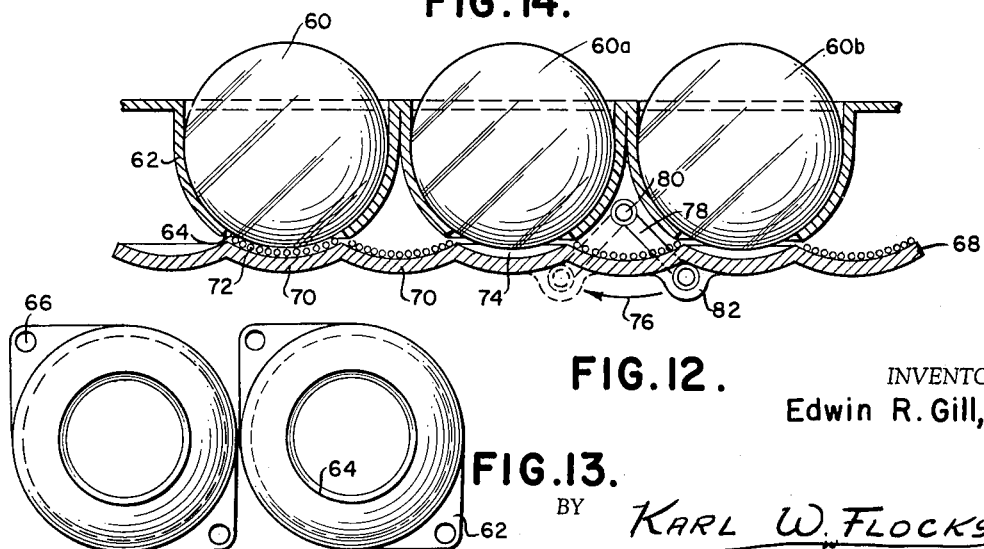
FIG. 12.
FIG. 13.
INVENTOR
Edwin R. Gill, Jr.
BY Karl W. Flocks
ATTORNEY March 1, 1966  E. R. GILL, JR  3,237,331
SIGN CONSTRUCTION Filed April 3, 1963  5 Sheets-Sheet 5

INVENTOR
Edwin R. Gill, Jr.

BY *Karl W. Flocks*
ATTORNEY

United States Patent Office 3,237,331
Patented Mar. 1, 1966

3,237,331
SIGN CONSTRUCTION
Edwin R. Gill, Jr., R.F.D. 2, Millerton, N.Y.
Filed Apr. 3, 1963, Ser. No. 270,426
11 Claims. (Cl. 40—137)

The present invention relates to signs and more particularly to signs which are capable of being selectively changed from one message to another and which utilizes the principle of collineation.

In applicant's copending application Ser. No. 270,450, filed April 3, 1963, entitled, Reflector, a type of reflection is defined known as collinear reflection. Collinear reflection results in the returning ray of light back tracking its particular incident ray along the same straight line as compared to the usual reflex reflection of light wherein the ray of light is returned to its source as a diverging cone of light.

Collinear reflection can be obtained by locating a short focus lens, which may be in the form of a sphere of relatively large diameter, in front of a conventional reflex reflecting surface made up of a plurality of glass beads having a relatively small diameter partially embedded or in contact with a reflecting surface. The reflex reflecting surface must be above the focal distance of the lens and for best results should be close to the lens or even in contact therewith. The condensing lens should have a diameter about 30–100 times the bead size, or even more.

The copending application referred to above described reflector constructions which utilized the principle of collineation.

It is an object of the present invention to provide changeable signs utilizing collineators.

Another object of the present invention is to provide an improved sign which conveys one message under certain conditions and another when conditions are different.

A further object of the present invention is to provide an improved sign, the message of which alters according to time, e.g. day to night.

A still further object of the present invention is to provide an improved simple mechanism for changing the message on signs utilizing collineation.

Other objects and the nature and advantages of the invention will be apparent from the following description taken in conjunction with the accompanying drawings, wherein:

FIG. 1 is a diagrammatic top plan illustrating the principle of the invention;

FIG. 2 is a cross-sectional view taken along the line 2—2 of FIG. 1;

FIG. 3 is a cross sectional view of a changeable sign in accordance with the present invention;

FIG. 4 is a front elevational view of the face of a sign made up of 96 lenses;

FIGS. 6 and 7 show the changeable sign of FIG. 4 with different messages thereon;

FIGS. 8–11 show various arrangements of the reflect reflecting discs to give as many as four alternate readings;

FIG. 12 is a cross sectional view of a portion of a changeable sign showing an arrangement for shifting the message;

FIG. 13 is a top plan view of two of the lenses supported by casings;

FIG. 14 is a back elevational view of a sign showing the mechanism for shifting the message;

Figure 6:
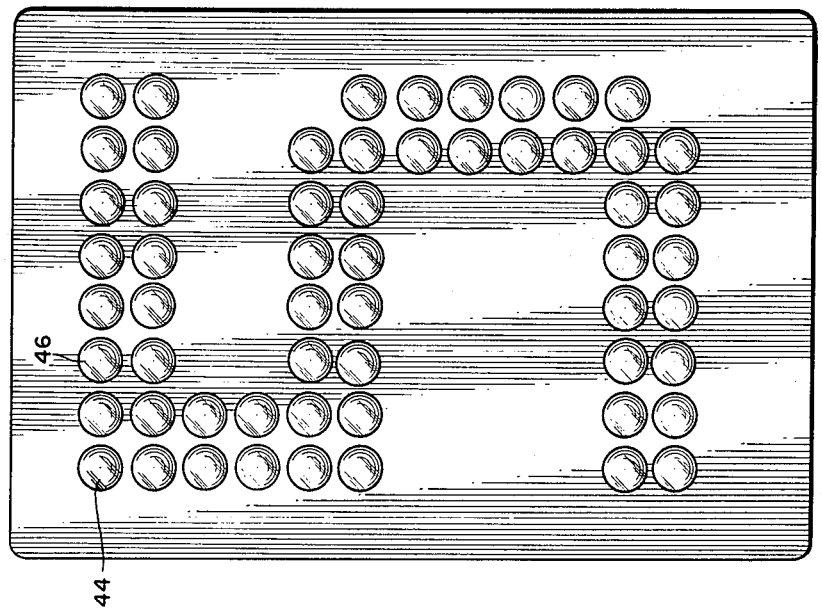

The changeable sign in accordance with the present invention includes a plurality of short focus lenses mounted over a shiftable screen carrying a plurality of control areas or discs, some of which are reflex reflective. Two or more control areas or discs are brought into alignment with the set of lenses thereby rendering certain or all of the lenses collineative and certain or all of the lenses light absorbing, thereby yielding a different message. Preferably the arrangement of the control areas and lenses are such that the distance of movement for shifting the screen is approximately equal to the radius of a lens.

As shown in FIGS. 1 and 2, four lenses 10, 12, 14 and 16 are shown in back of which are mounted eight control areas or discs. The control areas or discs have a diameter which is slightly less than the radius of the lenses, and the discs may be reflex reflecting or light absorbing. As shown in the drawing, discs 18 and 20 which are mounted in back of lens 10 are both reflex reflecting and include a face surface made up of small glass beads 34 partially embedded in a reflective binder 36. The arrow 38 represents the direction and extent of movement required to shift a screen 40 on which the discs are mounted so as to bring the disc 18 out of optical relation with the lens 10 and to bring the disc 20 into optical relation.

The area or disc 22 shown to be directly in alignment with lens 12 is light absorbing so that the lens 12 is blacked out in this position. The area or disc 22 may be painted black. The disc 24 is reflex reflective and upon shifting the screen 40 upwardly as shown by the arrow 38, the disc 24 comes into optical engagement with the lens 12 and renders it collineative. The reverse is true of lens 14 which is backed by reflex reflective disc 26 and light absorbing area or disc 28. The lens 16 is backed by a pair of reflex reflective discs 30 and 32.

Thus, it can be seen that as shown in FIGS. 1 and 2, lenses 10, 14 and 16 are collineative, whereas lens 22 is blacked out. After the shift of the discs upwardly according to the arrow 38, lens 14 becomes blacked out and lenses 10, 12 and 16 are collineative. In the position as illustrated, the discs 20, 24, 28 and 32 are removed from the areas of condensation of the lenses and are masked by the sign.

As shown in FIG. 3, a plurality of spherical lenses 31 are mounted in the face 42 of a sign casing 33. The lower ends of the lenses 31 are supported by a sheet 35 having a plurality of openings therethrough, each of which is adapted to receive a lens 31. The screen 40 containing the control discs 37 in alignment with the lenses 31 is adapted to move in slots 39 provided at each side of the sign casing 33.

FIG. 4 shows the face of a sign which is shown to be made up of 96 lenses. This is merely for purposes of illustration as any number of lenses of any convenient size may be used. The lenses may be mounted in the face 42 of the sign in any convenient manner such as shown in FIG. 3, and the face of the sign may be painted a suitable color, for example, black.

Figure 5:
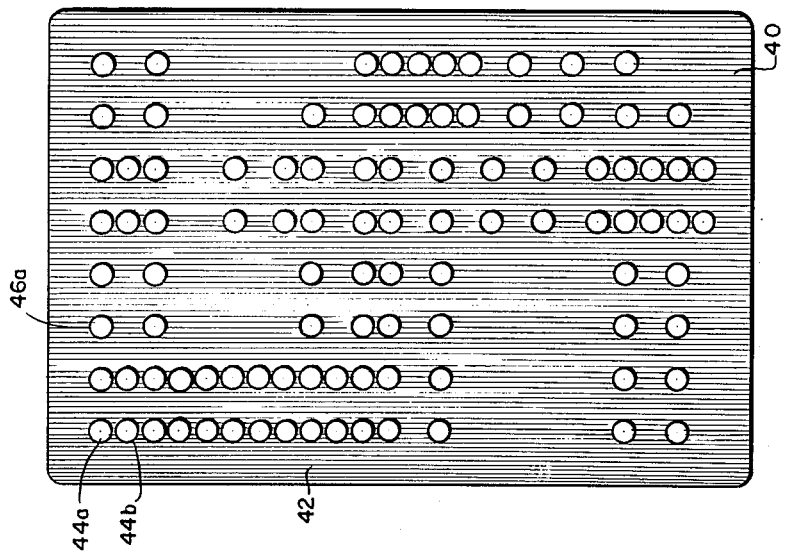
FIG. 5 is a front elevational view of a screen for use with the sign of FIG. 4.

FIG. 5 represents a screen 40 for mounting a plurality of reflex reflecting discs 42. The remainder of the face of the screen may be provided with light absorbing discs (not shown) or merely painted a light-absorbing color. A pair of reflex reflecting discs, for example 44a and 44b, are operatively associated with the corner lens 44. Thus, for either position of the screen 40, lens 44 remains collineative. A reflex reflecting disc 46a is shown to be in alignment with lens 46, but the lower spacing corresponding to disc 44b is light absorbing. Thus lens 46 is collineative, but when the screen is shifted upwardly it becomes blacked out. Other of the lenses shown in FIG. 4 are always blacked out, or become collineative when the screen is shifted.

Thus, when the screen 40 is in its lower position, as shown in FIG. 6 the collineative lenses reflect the numeral "5" as the message. When the screen is shifted upwardly, as shown in FIG. 7 the message changes and becomes the numeral "4."

It can readily be seen that such an arrangement lends itself readily to a sign which gives the permissible speed limit and which can be changed from one speed limit to another. Thus a speed limit sign normally reading 50 m.p.h. can be quickly changed to read 40 m.p.h. This is convenient in states where the daytime speed limit is 50 m.p.h. whereas the night-time speed limit is 40 m.p.h. In such cases, a clock mechanism can be used to trigger the shift of the screen 40 to effect this change in message.

On many highways it becomes important to post reduced speed limits due to weather conditions. The sign of this invention provides a means of accomplishing this by remote control, and the signs may be changed singly or in groups. Many other uses and adaptations of this changeable sign arrangement are contemplated.

The signs shown in FIGS. 1 and 2 provide for a vertical shifting to provide two alternate messages. FIGS. 8–11 show an arrangement where as many as four alternate messages are possible. Here four reflex reflecting discs or light absorbing areas are provided for each lens brought into operation by a combination of vertical and horizontal shifting of the screen 40. As shown in FIG. 8, the lens 50 is provided with four control areas or discs 52, 54, 56 and 58, with disc 52 positioned directly behind lens 50 in operative alignment therewith. FIG. 9 shows a shift of the screen to the left to bring disc 54 into operative alignment. FIG. 10 shows a shift upward to bring disc 58 into alignment. FIG. 11 shows a shift upwardly and to the left to bring disc 56 into alignment with the lens 50. The shift of position of the screen in two directions can be produced by a pair of solenoids working at right angles or other means. The shift may also be produced by the rotation of a stepping relay.

The distance of movement of the screen during the shifting step is kept to a minimum and the necessary mechanism may be contained compactly behind the signs and may operate on a few dry cells, if desired, so as to move the screen from one position to another by nothing more than a servo-relay, solenoid or a two-position latch. Thus, when the sign is to be operated by remote control, various combinations are possible. The simplest way is by means of a relay or solenoid actuating a two position latch. With a two position sign, when the sign is at the normal position, one impulse moves the control screen to the alternate position. From this alternate position, the next impulse restores the sign to normal.

Thus, a sign in accordance with this invention includes an opaque face having a plurality of transparent lenses arranged uniformly and a movable screen in back of the mask having at least a pair of control areas or discs corresponding to each lens. The control areas or discs may be either reflex reflecting or light absorbing so that a positional shift of the control screen will render some of the lenses collineating and others light absorbing. Thus, when the movable screen is in one position, the control areas or discs not in use will be invisible thru the lenses and when the screen is shifted by a distance no greater than the radius of a lens, the control areas previously invisible now become visible thru the lenses.

In FIG. 12 is illustrated a sign wherein the lenses 60 are mounted in cups 62 having circular openings 64 in the bottom which have a diameter equal to one half the distance from center to center of adjacent lenses. The cups are shown in FIG. 13 with means 66 for mounting them onto the face of a sign. The screen 68 is embossed with indentations 70. As shown, there are twice as many indentations 70 as there are lenses 60, and each indentation is the same size as the openings 64 in the cups 62. The upper surface of each indentation acts as a control area and may either be reflex reflecting as shown at 72 or light absorbing as shown at 74. The reflex reflecting surfaces include small glass beads partially immersed in a reflecting binder as previously described. Each reflex reflecting surface is curved to conform to the rear surface of the lens 60 and is in contact therewith. With this type of close fitting screen, a simple slide from one position to another is not feasible. A swinging movement as shown by the arrow 76 is provided by mounting the screen 68 on four arms 78. A pair of arms 78 are mounted one at each end of an axle 80 which may be journaled in the case of the sign. The free ends of the arms 78 are pivoted to lugs 82 projecting from the screen 68. The support of the screen 68 is completed by another similar axle and a pair of arms at another point.

When the screen 68 is in the position shown lens 60 is collineative being backed by the reflex reflecting surface 72, while the other two lenses 60a and 60b are light absorbing. When the screen swings to the position indicated by the dotted lines and the arrow 76, all three lenses become collineative.

FIG. 14 shows from the back, another method of supporting a screen 84 by a pair of parallel links 86.

Figure 15:
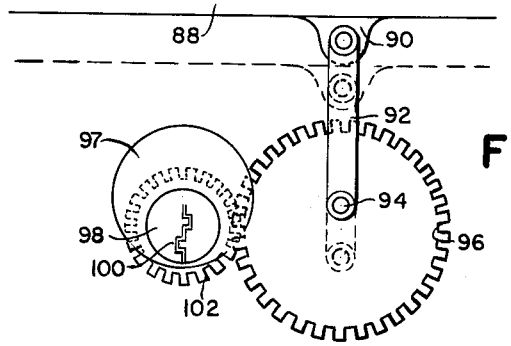
FIG. 15 is a partial showing of a mechanism for manually shifting the screen to change the message.

FIG. 15 illustrates a means of actuating movement of the screen 88 manually by means of a lug 90 to which is pivoted a connecting rod 92. The free end of the rod is fitted to a crank pin 94 projecting from a gear wheel 96. The body 97 of a pin tumbler lock is shown carrying a cylinder 98 with a keyway 100 therein. The lock may be flush mounted either in the front or rear of the sign case. The gear wheel 102 is carried on or shafted to the cylinder 98. The gear wheel 102 meshes with the gear wheel 96 and as the ratio is 2:1, a full turn of the gear wheel 102 is required to revolve gear wheel 96 a half turn. Thus, the key may be inserted, revolved one full turn in either direction and then withdrawn locking the screen in position. Only an authorized person having a key can alter the message on a sign utilizing this method of actuation.

Figure 16:
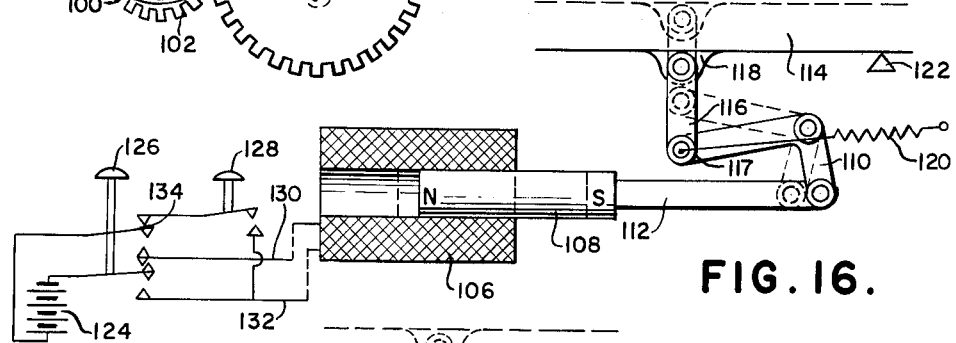
FIG. 16–18 show various electro-mechanical mechanisms for shifting the screen.
Figure 17:
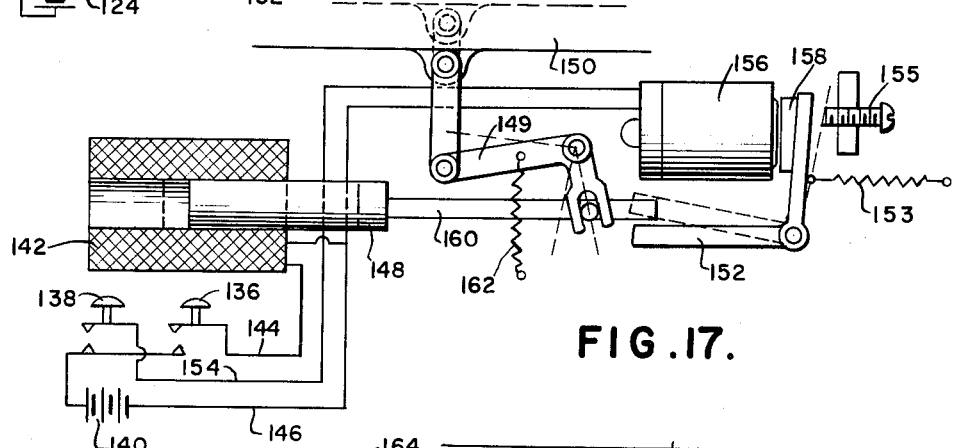
Figure 18:
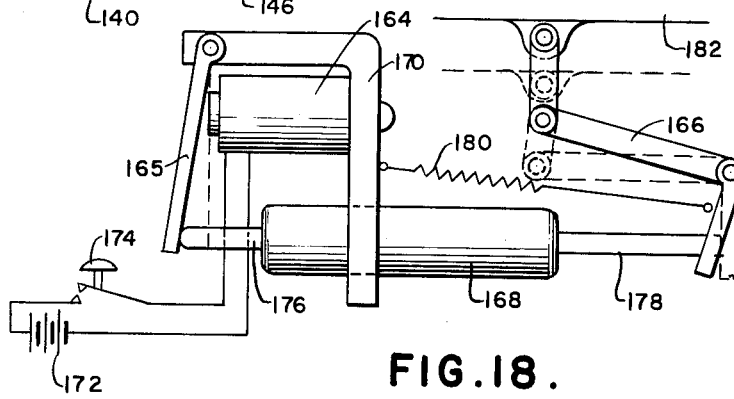

FIGS. 16–18 illustrate electro-mechanical means of moving the screen using either solenoids or electro-magnets.

FIG. 16 shows the use of a solenoid 106 fitted with a polarized plunger 108 made of a permanent magnetic alloy such as Alnico V. The longitudinal motion of the plunger 108 is transmitted to the bell crank lever 110 by the extension rod 112, and thence to the screen 114 through the link 116 pivoted to the lug 118 and to the free end 117 of the bell crank lever 110. A spring 120 extends from the free end 117 of the bell crank lever 110 to a point beyond the fixed pivot of the crank so as to hold the moving parts in one or the other position against the lower stops 122 or upper stops, not shown. As the plunger 108 is polarized, its direction of motion depends on the direction of current in the windings of the solenoid 106. A battery 124 and a reversing switch arrangement operated by push buttons 126 and 128 is shown at the left of the solenoid. The contacts are normally held in the position shown by spring tension. When button 126 is pressed, the positive pole of the battery is applied to the solenoid through wire 130 and the negative through wire 132, and the plunger 108 is drawn into the bore raising the screen 114 to the dotted line position against the upper limit stops where the tension of spring 120 holds it. When the button 128 is pressed, the positive pole of the battery is applied to the wire 132, whereupon the plunger 108 is forced outward lowering the screen to the position shown in solid lines. The extra pair of contacts 134 have been provided to the reversing switch in order to insure against a short circuit of the battery should both buttons be depressed at once. This pair of safety contacts 134 open the circuit of button 128 when button 126 is used.

FIG. 17 shows apparatus using a non-polarized solenoid. Solid lines show the parts in the normal position. When the button 136 is pressed the battery 140 is connected to the solenoid 142 through wires 144 and 146 and the plunger 148 moves to the left carrying the bell crank lever 149, thus raising the screen 150 to the limit of its travel permitting the arm 152 to move to the position indicated by dotted lines due to spring 153 and stop 155 thus locking the screen in the alternate direction. The screen is returned to the normal or lower position by pressing the button 138 which connects the battery through wires 154 and 146 to the electro-magnet 156 which attracts the armature 158, thus lowering its arm 152 and unblocking the extension rod 160 so that the screen can move down assisted by the spring 162.

FIG. 18 shows apparatus actuated by an electro-magnet 164 and armature 165 working against the bell crank lever 166 through a two-position latch 168. A frame member 170 supports the electro-magnet, armature and body of the latch mechanism 168. When the battery 172 is applied to the coil of the electro-magnet 164 by pushing the button 174, the push rod 176 is moved to the right by the armature 165. This motion is in turn transmitted to the rod 178 moving the lever 166 and the screen 182 to the dotted line position against the tension of spring 180. The latch 178 now operates to hold the lever 166 in the dotted line position. The next pulse of current releases the latch 178 allowing the rod 178 to retract and the spring 180 to return the lever 166 to the solid line position with similar movement of the screen 182.

Any suitable type of two-position latch can be utilized. For example, a suitable latch can be operated by rotating a toothed collar one step each time the rod 176 is pushed. At each alternate step, projections on the collar align with grooves in the barrel which allows the rod 178 to move to the left or to align with notches which prevent motion to the left and hold the rod 178 in the right hand position, as the case may be. One pulse of current thru the electromagnet 164 moves the rod 178 to the right hand position and latches it there; the next pulse unlatches it, freeing it to move to the left in response to the spring 180 and so on alternately.

The switches are shown as worked by push buttons but they may be parts of a relay assembly in cases where it is desired to control signs at a distance by radio. A number of signs may be controlled from a central point by a pair of wires or even a single wire using a ground return. A number of hook ups are possible, such as control by a radio signal from a patrol car.

The mechanisms illustrated may operate either to push the screen upwardly from the bottom or are equally adapted to pull from the top.

The changeable signs utilizing this invention can utilize contrasting colors wherein lenses are rendered collineative in color. The message may either appear reflex reflecting on a black background as shown or the message may be black on a reflex reflecting background.

It will be obvious to those skilled in the art that various changes may be made without departing from the scope of the invention and therefore the invention is not limited to what is shown in the drawings and described in the specification but only as indicated in the appended claims.

What is claimed is:

1. A changeable sign comprising a plurality of discrete short focus spherical lenses, a shiftable screen mounted behind said lenses, at least a pair of control areas on said screen behind each said lens so that in each position of said screen a different one of said control areas is brought into alignment with each said lens, certain of said control areas on said screen being reflex reflecting and certain of said control areas being light absorbing, said reflex reflecting areas comprising a plurality of small glass beads in optical contact with a reflecting surface, said lenses having a diameter at least 30 times the diameter of said beads, and means for shifting said screen from one position to another position, whereby when said screen is in one position those lenses in alignment with reflex reflecting control areas become collineative and yield a particular message and when said screen is shifted to another position, those lenses in alignment with reflex reflecting control areas yield a second message.

2. A changeable sign in accordance with claim 1 wherein two control areas are on said screen corresponding to each said lens, and each control area has a diameter approximately one half the diameter of each said lens.

3. A changeable sign in accordance with claim 1 wherein four control areas are on said screen corresponding to each said lens, and each control area has a diameter approximately one half the diameter of each said lens.

4. A changeable sign in accordance with claim 3 with means for shifting said screen both longitudinally and laterally.

5. A changeable sign in accordance with claim 1 wherein said means for shifting said screen are electro-mechanical.

6. A changeable sign in accordance with claim 1 wherein said means provide for shifting said screen by longitudinal movement.

7. A changeable sign comprising a face plate, a plurality of discrete short focus spherical lenses mounted in said face plate with their upper surfaces exposed, a lower plate mounted below said face plate, said lower plate having a plurality of openings therethru, each said opening being in alignment with one of said lenses and being adapted to support said lens, a shiftable screen mounted beneath said lower plate, at least a pair of control areas on said screen corresponding to each said lens, so that in each position of said screen a different one of said control areas is brought into alignment with each said lens, certain of said control areas on said screen being reflex reflecting and certain of said control areas being light absorbing, said reflex reflecting areas comprising a plurality of small glass beads in optical contact with a reflecting surface, said lenses having a diameter at least 30 times the diameter of said beads, and means for shifting said screen from a first position to a second position whereby when said screen is in a first position those lenses in alignment with reflex reflecting control areas become collineative and yield a particular message and when said screen is shifted to a second position, those lenses in alignment with reflex reflecting control areas yield a second message.

8. A changeable sign in accordance with claim 7 wherein two control areas are on said screen corresponding to each said lens, each control area having a diameter corresponding to the diameter of openings in said lower plate, said diameter being approximately one half the diameter of each said lens.

9. A changeable sign comprising a plurality of short focus spherical lenses, a plurality of discrete cup shaped supports, each said support having a diameter conforming to the diameter of said lenses for supporting said lenses with their upper surfaces exposed, a circular opening in the bottom of each said support thru which the lower portion of the lens supported therein extends, the diameter of said opening being approximately one half the diameter of said lens, a shiftable screen mounted beneath said lenses, at least a pair of control areas on said screen corresponding to each said lens, so that in each position of said screen a different one of said control areas is brought into alignment with each said lens, certain of said control areas on said screen being reflex reflecting and certain of said control areas being light absorbing, said reflex reflecting areas comprising a plurality of small glass beads in optical contact with a reflecting surface, said lenses having a diameter at least 30 times the diameter of said beads, and means for shifting said screen from a first position to a second position, whereby when said screen is in a first position those lenses in alignment with reflex reflecting control areas become collineative and yield a particular message and when said screen is shifted to a second position, those lenses in alignment with reflex reflecting control areas yield a second message.

10. A changeable sign in accordance with claim 1 wherein said means for shifting said screen are a two-position latch operatively connected to said screen, and, electromechanical means for actuating said latch from one position to the other.

11. A changeable sign in accordance with claim 1 wherein said means for shifting said screen are a bell crank lever operatively attached at one free end to said screen and at its other free end to a plunger actuated by a solenoid, and remote control means for actuating said solenoid when it is desired to shift the message on said sign.

References Cited by the Examiner

UNITED STATES PATENTS

| | | | |
|---|---|---|---|
| 1,038,795 | 9/1912 | Simpson | 40—52 |
| 1,114,267 | 10/1914 | Jones | 40—133 X |
| 2,432,896 | 12/1947 | Hotchner | 40—106.53 |
| 2,507,975 | 5/1950 | Hotchner | 40—196.53 |
| 2,852,767 | 9/1958 | Foller et al. | 40—52 X |
| 2,951,419 | 9/1960 | Lemelson | 88—82 |

FOREIGN PATENTS 510,817  12/1920  France.

EUGENE R. CAPOZIO, *Primary Examiner.*

JEROME SCHNALL, *Examiner.*

W. J. CONTRERAS, *Assistant Examiner.*